T. A. BRYSON

SAFETY GUARD FOR CENTRIFUGAL MACHINES

Nov. 24, 1931.

Re. 18,254

Original Filed April 10, 1923 3 Sheets-Sheet 1

INVENTOR

T. A. Bryson

By John D. Morgan

ATTORNEY

T. A. BRYSON

SAFETY GUARD FOR CENTRIFUGAL MACHINES

Nov. 24, 1931.

Re. 18,254

Original Filed April 10, 1923 3 Sheets-Sheet 2

INVENTOR

T. A. Bryson

BY John D. Morgan

ATTORNEY

T. A. BRYSON

SAFETY GUARD FOR CENTRIFUGAL MACHINES

Nov. 24, 1931. Re. 18,254

Original Filed April 10, 1923 3 Sheets-Sheet 3

INVENTOR

T. A. Bryson

BY

John D. Morgan

ATTORNEY

Reissued Nov. 24, 1931

Re. 18,254

UNITED STATES PATENT OFFICE

TANDY A. BRYSON, OF TROY, NEW YORK, ASSIGNOR TO TOLHURST MACHINE WORKS, A CORPORATION OF NEW YORK

SAFETY GUARD FOR CENTRIFUGAL MACHINES

Original No. 1,649,947, dated November 22, 1927, Serial No. 631,063, filed April 10, 1923. Application for reissue filed August 22, 1929. Serial No. 387,774.

The invention relates to safety guards for centrifugal machines, and more particularly to a novel and greatly improved form of such guards which automatically prevents the machine being started before the basket lid or closure is closed, and also prevents the basket closure being opened until the basket is entirely at rest.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Figure 1:
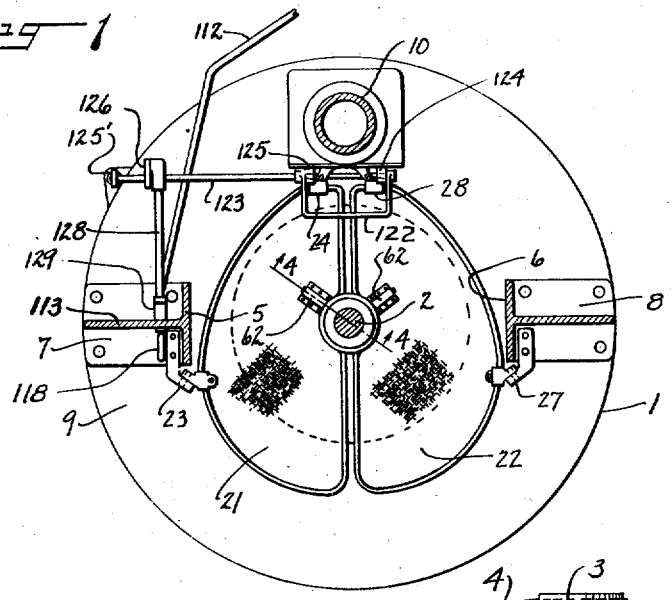
Fig. 1 is a top plan, with parts in section of a mechanism embodying the invention.

The invention is directed to providing a novel and useful safety guard for centrifugal machines, which will necessarily compel the complete closure of the basket closure or lid before the power can be applied to start the basket rotating, and also will effectively prevent the opening of the basket lid or closure before the basket has come completely to rest. In realizing this general object, the invention provides locking means for the basket lid or closure which are movable by an operative to permit the opening of the lid or closure, after the basket has come to rest, but which returns automatically and immediately to locking position as soon as released by the operative after the opening of the lid or closure. In cooperation and conjunction therewith a mechanism is provided whereby the power may be turned on to rotate the basket only when the basket lid or closure is in the closed and locked position, this means being controlled directly from the basket closure.

Referring now by way of example to the present preferred embodiment of the invention, illustrated by way of example in the accompanying drawings, a centrifugal machine of a substantially standard type or form is shown having a casing 1 within which is the usual basket (not shown). The basket is supported by and rotated by the shaft 2, which shaft is driven in a suitable manner, as by a pulley 3 fast on the shaft, over which pulley runs a driving belt 4. This shaft is carried in bearings mounted upon the upper part of upright frame pieces 5 and 6, the bases 7 and 8 of which, respectively, are bolted to and supported by the top portion 9 of the casing 1. A standard 10 is likewise fixed to the top of the casing and extends upwardly to support the shaft bearing and also the belt pulleys and other parts. The upper parts of these supports are broken away as they constitute per se no part of the present invention. This construction so far described is a well-known type of construction and need not be described in further detail.

The embodied form of safety lid or closure comprises two lids or halves 21 and 22, the lid 21 being hinged at 23 and 24, and turning up and down on an axis passing through these hinges, the hinges being mounted either directly or indirectly upon the top of the casing. In like manner the lid member 22 is mounted on hinges 27 and 28, and turns up and down on an axis passing through these hinges, the hinges being likewise mounted upon the casing.

The two lids 21 and 22 close down about and encircle the shaft 2, and when they are raised up, they engage with and are held in the raised position by automatically acting detent hooks 29. This form of casing closure is the same as, or substantially similar to, that shown in my Patent No. 1,160,373 dated November 16, 1915, although the invention in its broader aspects is applicable to other forms of centrifugal casings or basket closures, and the present embodiment will not be regarded as restrictive of the invention.

Referring now in detail to the embodied form of the lid or closure locking devices (Figs. 1 to 5), a sleeve 34 fits closely about the shaft 2 at the level of the top of the casing and somewhat thereabove. This sleeve is fixed to the shaft 2 to rotate therewith in a suitable manner as by clamping screws 35 which are screw-threaded into the sleeve 34 and engage the shaft 2. A stop collar 36 is also preferably employed at the top of the sleeve, and this is likewise held in position in suitable manner by the screw 35.

Loosely encircling the fixed sleeve 34 is a locking ring 37, which is slidable longitudinally of the sleeve. A flange 33 on sleeve 34 is a bottom stop for ring 37. This ring has on its bottom portion an outwardly and downwardly extending conical skirt 38, beneath the bottom edge of which a cooperating locking member, or members. on the casing lid or closure engages to lock the lid in closed position. On its inner surface, which is in sliding engagement with the sleeve 34, the locking ring 37 is provided with a helical groove 40 of relatively very great pitch, and this groove preferably terminates at its upper end in a locking notch 41. A pin 42 is fixed in the sleeve 34 and works in the groove 40. As a matter of convenience, the locking ring 37 is preferably provided with both a right-hand groove 40 and a left-hand groove 40′, and the pin 42 may be positioned in either groove dependent upon the direction in which the basket and its shaft 2 are to be rotated.

Mounted on each of the casing lids or closures 21 and 22 are suitable cooperating locking means, and as shown, a spring latch 60, having a beveled nose 61, is longitudinally reciprocably mounted in an aperture in the front end of a casing 62 fastened to, and mounted upon, the upper surface of the corresponding lids 21 and 22. The latch 60 has extending from the rearward end thereof a cylindrical pin 64, which is also longitudinally reciprocably supported in an opening in the rear wall of the casing 62. A helical spring 65 is in compression between the rear wall of the casing 62 and the rear end of the latch head 60. Thus, when the lid or closure 21 or 22 is closed, the beveled end 61 of the latch will engage with the beveled skirt 38 of the locking ring, and the latch will be pressed backwardly against its spring 65, and then will snap outwardly beneath the skirt 38 and thus be locked, the pin 42 in the recess 41 preventing the upward motion of the locking ring 37.

The manner of operation of the mechanism just described is substantially as follows:—

Figure 4:
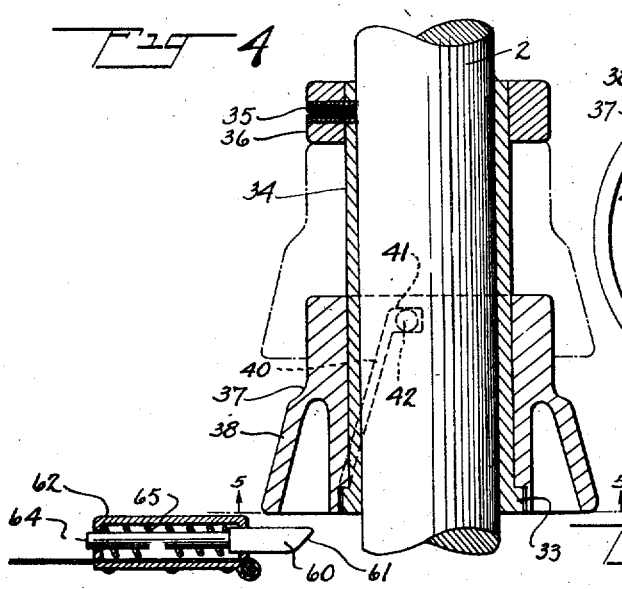
Fig. 4 is a fragmentary vertical section, greatly enlarged, taken substantially on line 4—4 of Fig. 1, looking in the direction of the arrows.
Figure 5:
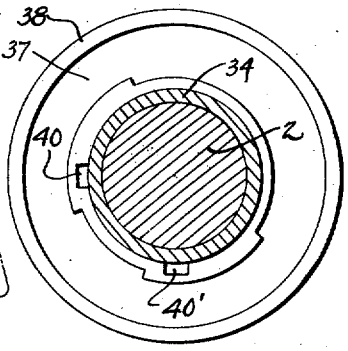
Fig. 5 is a horizontal section, taken substantially on line 5—5 of Fig. 4, looking in the direction of the arrows.

The mechanism may be regarded as in the full line position of Fig. 4, and the operative releases the lids 21 and 22 from their spring catches 29, and as they drop down, the latches 60 will lock the lids beneath the skirt 38 of the locking ring as just described, and the pin 42 will hold the locking ring in its position. The closing of the lids will permit the turning on of the power and the rotation of the basket and its shaft 2 by mechanism and in a manner which will be later described.

After the drying or other centrifugal separating action is completed, it will be impossible for an operator to grasp the locking ring 37 and raise it to the broken line position of Fig. 4 (thereby to release and permit the opening of the lids 21 and 22) until the shaft 2 has absolutely come to rest. That helical groove 40 in the locking ring is used so that the locking ring must turn in the direction of rotation of the shaft 2 when it is raised from locking to unlocking position. When the basket shaft 2 is moving, any friction on the locking ring 37 caused by an operative grasping the locking ring tends to cause the locking ring to rotate backwardly relatively to the basket shaft 2, and the direction or position of the groove 40 causes a compelling downward pressure on the ring 37, whereby it is firmly held down. Practical tests have shown it to be impossible to turn the locking ring in the direction of rotation of shaft 2 and at the same time to lift the ring, even when the shaft is rotating exceedingly slowly and is about to come to rest.

Figure 2:
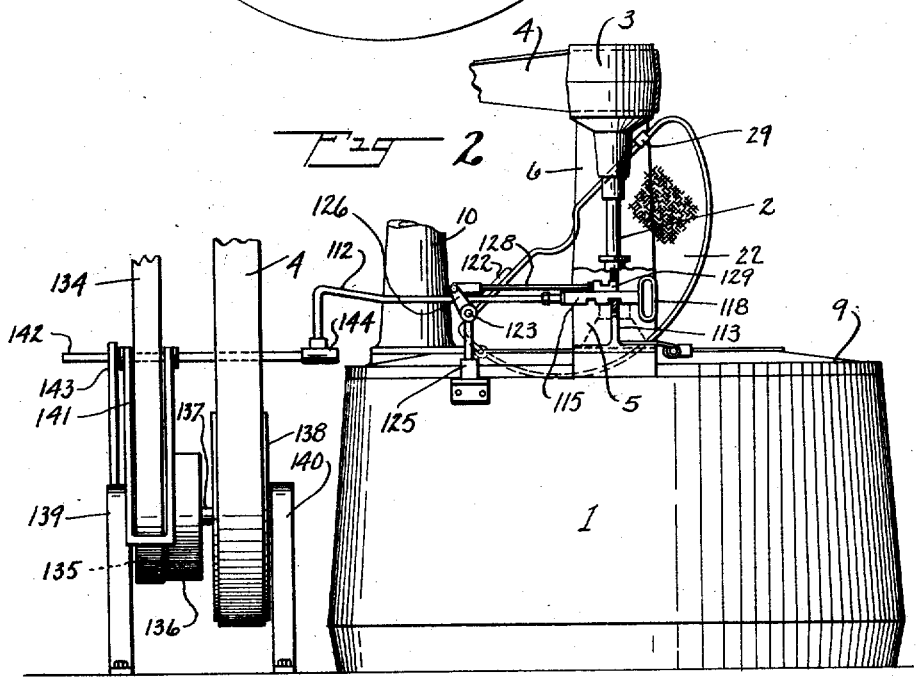
Fig. 2 is a side elevation looking at Fig. 1 from the left.

The pitch or inclination of the groove 40, while sufficient to prevent the locking ring being raised until shaft 2 has come absolutely to rest, is sufficiently steep to permit the locking ring to drop back of its own weight to locking position, that is, from the broken line position to the solid line position of Fig. 2. The acquired inertia at the end of the drop is sufficient to rotate the locking ring and bring the pin 42 into the locking groove or pocket 41, so that the locking ring may not again be lifted on the shaft without at the same time rotating it, which can only be done when the shaft is at rest.

Figure 9:
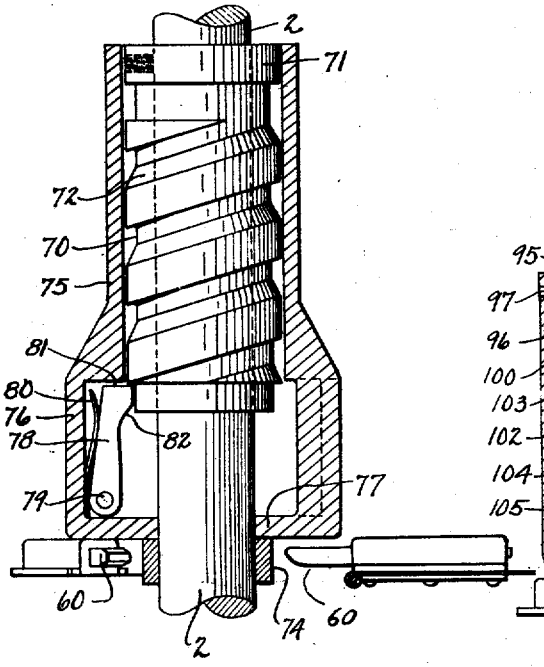
Fig. 9 is a vertical central section of a modified form of the basket closure locking and releasing device.

In Fig. 9 a modified form of the locking mechanism is shown wherein a sleeve 70 is fixed on the shaft 2, this sleeve having a heavy helical groove or screw-thread 72 formed on the exterior surface thereof. A stop collar 71 is formed at the upper end of the sleeve 70. A stop collar 74 is also provided at the lower end of the path of travel of the locking device. The locking device in this case consists of a cylinder 75, surrounding loosely the sleeve 70, the cylinder having an enlarged hollow lower portion 76, the flat bottom face of which constitutes the latch-engaging surface or device. A pawl 78 is within the enlarged lower portion 76 of the cylinder or casing 75, the pawl being pivotally supported at 79 and acted upon by a spring 80, which impels it inwardly toward the shaft 2. The upper end of the pawl constitutes a square face 81 and the underside of the pawl constitutes a bevel face 82. Spring pressed latches 60 carried by the closure snap under the lower edge of portion 76 for holding the cover closed.

This mechanism operates in substantially the same manner as that of Fig. 4. That is, the groove or thread 70 or 72 is inclined so that by reason of the frictional engagement of the square end 81 of pawl 78 therewith, it is necessary to rotate the locking member 75 in the direction of rotation of the shaft 2 to raise the locking member from the locking position of Fig. 9. When the operative grasps the locking member 75, if shaft 2 is rotating even slightly, the screw-thread thrusts the head 81 of the pawl downwardly and holds, or impels the member 75 to locking position.

When the shaft is at rest, the locking member 75 may be rotated and lifted upwardly to release the lids 21 and 22. When the operative lets go of the locking member 75, the bevel face 82 of the pawl 78 engages with the thread 72 on sleeve 70, and the pawl is cammed backwardly, that is, radially outwardly against the spring 80. The locking member 75 will immediately drop to the locking position of Fig. 9, whereupon the pawl 78 will snap inwardly radially and its square head 81 will lock beneath the screwthread 72 of the sleeve 70.

Figure 10:
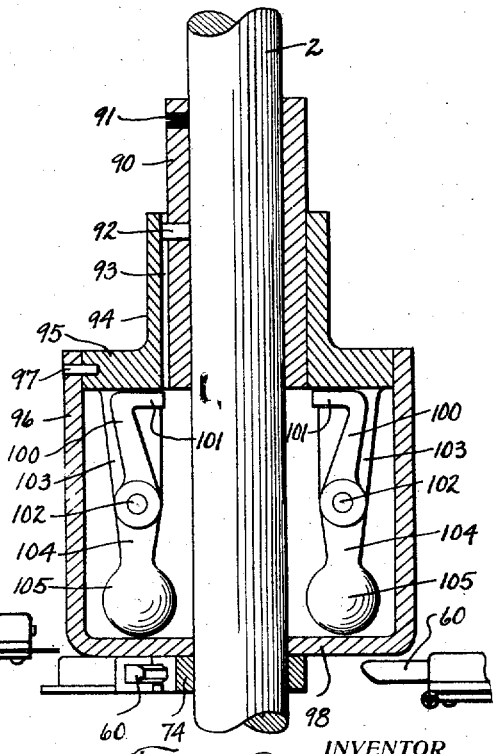
Fig. 10 is a like view of another modified form of said device.

In Fig. 10 another modified form of the locking mechanism is shown, wherein a collar 90 is fixed to the shaft 2 to rotate therewith by suitable means, such as a clamping screw 91. A pin 92 is fixed in the sleeve 90 and projects outwardly into a slot 93 in a cylinder 94, which cylinder loosely encircles the sleeve 90. Thereby the cylinder 94 must rotate with the sleeve but is longitudinally slidable along the sleeve and therefore along the shaft 2. The cylinder 94 at its bottom end terminates in a horizontal annular flange 95, and an enlarged cylinder 96 fits about the circular periphery of the flange 95 and is fixed thereto by suitable means, such as pins or screws 97. The cylinder 96 at its bottom end terminates in a flat circular head 98, beneath which the spring latches 60, mounted on the lids 21 and 22 are adapted to engage to lock the lids in closed position.

Mounted within the cylinder 96 are one or more, preferably at least two, centrifugally operating locking detents. As embodied, a detent member 100 has a horizontally-extending end 101, adapted to move into and out of locking engagement below the lower end of the sleeve 90 by centrifugal action. This locking member is pivotally connected at 102 upon a supporting bracket 103, extending downwardly from the bottom face of the flange member 95.

Fixed to, or integral with, the locking member 100 is a downwardly-extending tail 104, terminating preferably in a weight 105. When the lids 21 and 22 are closed, their locking latches 60 will snap into locking position beneath the lower head 98 of the cylinder 96. As soon as the shaft 2 begins rotating, centrifugal action will move the fingers 101 inwardly immediately into locking engagement beneath the lower end of the sleeve 90. The parts are so proportioned that the very slowest rotatory motion of shaft 2, due to centrifugal action, will immediately cause this locking engagement.

When shaft 2 comes completely to rest, the fingers 101 are just clear of the bottom of the fixed sleeve 90, and the locking device may be slid longitudinally upwardly up along the shaft, the pin 92 sliding in the groove 93. After the lids 21 and 22 are lifted, the locking device will immediately and automatically again drop to locking position as soon as the operative lets go thereof. It will be understood that these modified forms are likewise illustrative and explanatory of the invention, and that other forms may be devised within the scope of the appended claims.

The present preferred embodiment of cooperating means for preventing the power being turned on and the basket started into rotation before the lids are closed, is shown applied to an ordinary belt shifter, although it will be understood that it is likewise applicable to other forms of power control, such as the starting box for an electric motor or other power device. As embodied, a rod 112 is longitudinally slidable in a suitable support, here shown as the web 113, which is a part of the bearing support 5 already described, the rod being slidable to and fro in an aperture or slot 114 in the web. The rod 112 is preferably formed at its forward end into a flat plate 115, having in its bottom edge two locking notches 116 and 117, adapted to fit over the flange 113 at the bottom side of the slot 114 to hold the rod 112 firmly in either the power-off or the power-on positions. This device is preferably provided with a handle 118.

The controlling device for the foregoing mechanism, or its equivalent, in its present embodied form, comprises a device movable by and with the lids 21 and 22. As so embodied, a bail 122 is fixed at either end to a rod 123, which rod is journaled in lugs 124 and 125, which are mounted on the casing. Rod 123 extends outwardly and at its outer end is mounted in a bearing 125'. Fixed to this rod is a crank arm 126, to which is pivoted at its free end 127, a rod 128 terminating at its front end in a flat plate 129, which, likewise is reciprocable in the slot 114. The plate 129 is provided with high parts or projections 130 and 131 at its ends with a low part 132 therebetween.

Figure 6:
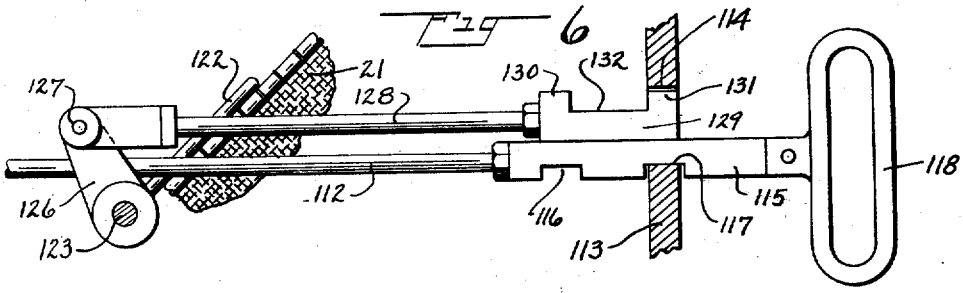
Figs. 6, 7 and 8 are fragmentary views, showing different positions of the safety device and control for the basket driving mechanism.

In the operation of this device, the operating rod 112 for the driving power for the basket may be regarded as in the power-off position, with the notch 117 resting over the flange 114, as it was necessary that the rod 112 be moved in this position before the locking device on the shaft 2 could be moved to permit the raising of the lids 21 or 22. By raising either lid, the bail 122 is rocked upwardly, and thereby the crank arm 126 is rocked to the left in Fig. 6, and the projection 131 is alined in the aperture 114, thereby locking the power controlling rod 112 in the power-off position. These parts must remain in this position so long as either lid is unclosed.

Figure 7:
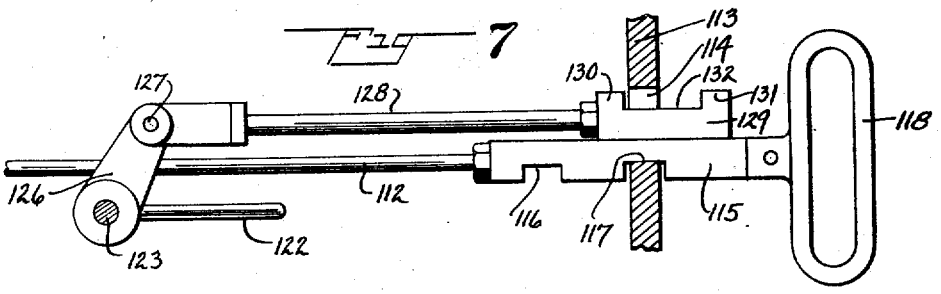
Figure 8:
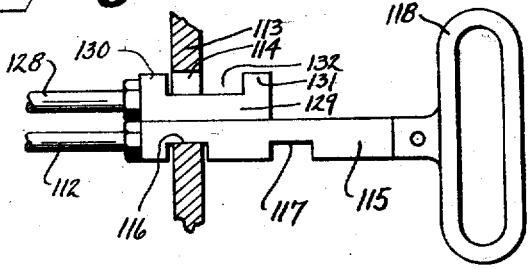
Figure 3:
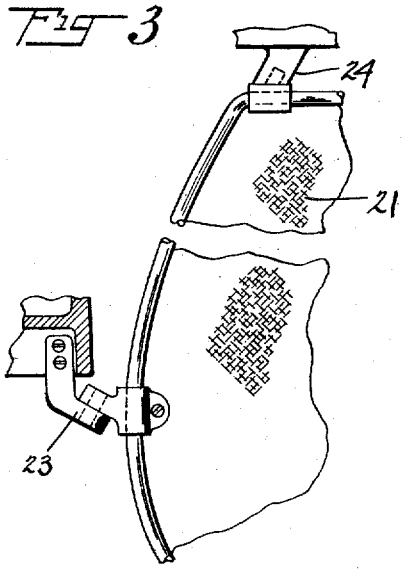
Fig. 3 is a detached detail of the hinges of the basket closure.

When both lids 21 and 22 are closed, the bail 122 drops therewith to the position shown in Fig. 7, and the bail is sufficiently heavy to rock the arm 126 to the right, and the depression 132 is thereby brought into line with the slot 114. This permits the rod 112 to be lifted from the position of Fig. 7 and moved to that of Fig. 8, when the recess 116 stops the rod in the power-on position. While the rod 112 may now be manipulated at will to turn on and off the power, it will be recalled that the latches 60 have locked the lids 21 and 22 in closed position and they may not be released until the basket and its shaft 2 have come to a full stop. If either lid be lifted, the rod 112 is thereby locked in the power-off position.

As stated, the foregoing mechanism is shown exemplarily applied to a belt shifter, wherein a driving belt 134 is driven in a suitable manner, as from the counter shaft or otherwise, and is movable between the fast and loose pulleys 135 and 136 on shaft 137. Fixed on shaft 137 also is a pulley 138 over which runs the basket driving belt 4. Shaft 137 is journaled in bearing blocks 139 and 140. A belt shifter 141 is attached to a longitudinally reciprocable rod 142, mounted reciprocably at one end in a bearing 143 and at its other end 144, fixed to the shaft 112.

One of the advantages of my invention is that the operator may turn the basket freely by hand to facilitate loading and unloading without danger of having the guard or lid thrown down on his hand, which is a danger common to practically all safety devices having the usual interlocking construction.

The invention in its broader aspects is not limited to the specific mechanisms shown and described, but departures may be made therefrom within the scope of the accompanying claims without departing from the principles of the invention and without sacrificing its chief advantages.

What I claim is:—

1. A safety device for centrifugal machines including in combination a basket, a closure therefor, means operating automatically by closing the closure to lock it in closed position, and means at the center of the basket movable to permit the unlocking of the closure only when the basket is at rest and returning automatically to closure-locking position after its closure-unlocking movement.

2. A safety device for centrifugal machines including in combination a basket, a closure therefor, means operating automatically by closing the closure to lock it in closed position, and means cooperating with the shaft of the basket movable to permit unlocking of the closure only when the basket is at rest and returning automatically to locking position immediately after such movement, basket rotating means and means preventing said means rotating the basket until the closure is closed.

3. A safety device for centrifugal machines including in combination a basket, a closure therefor, inter-engaging means partly on the closure and partly on the basket shaft, operating automatically by closing the closure to lock it in closed position and means preventing the unlocking of the closure until the basket is at rest.

4. A safety device for centrifugal machines including in combination a basket, a closure therefor, means operating automatically by closing the closure to lock it in closed position and means cooperating with the shaft of the basket movable to permit the unlocking of the closure only when the basket is at rest, and returning automatically to locking position after said closure is unlocked, basket rotating means and means controlled by the closure for preventing said means rotating the closure until the closure is closed.

5. A safety device for centrifugal machines including in combination a basket, a closure therefor, means operating automatically by closing the closure to lock it in closed position, cooperating means carried partly by the closure and partly by the basket shaft preventing the unlocking of said closure until the basket is at rest, said means carried by the basket shaft being movable to unlock said closure only when the basket is at rest and returning automatically to closure-locking position after its closure-unlocking movement, basket rotating means, and means operating to prevent rotation of the basket by said rotating means when the closure is not in basket-closing position.

6. A safety device for centrifugal machines including in combination a basket and its shaft, a basket closure, a safety device on the shaft normally in locking position and a locking device on the closure automatically locking with said safety device by closing the closure.

7. A safety device for centrifugal machines including in combination a basket and its shaft, a basket closure, a safety device on the shaft, movable to unlocking position and returning immediately to locking position and a locking device on the closure automatically locking with said safety device by closing the closure.

8. A safety device for centrifugal machines including in combination a basket and its shaft, a basket closure, a safety device on the shaft, movable to unlocking position and returning automatically and immediately to locking position and a locking device on the closure automatically locking with said safety device by closing the closure.

9. A safety device for centrifugal machines including in combination a basket and its closure, a safety device cooperating with the basket shaft and maintained in locking position by the rotation of the basket, but movable to unlock the closure only when the basket comes to rest and returning immediately to locking position after the closure has been unlocked preparatory to locking the closure again as soon as it is closed.

10. A safety device for centrifugal machines including in combination a basket and its closure, a safety device carried partly by the closure and partly by the basket shaft and maintained in locking position by the rotation of the basket, but movable to unlock the closure only when the basket comes to rest and returning automatically and immediately to locking position as soon as said closure has been unlocked preparatory to locking the closure again as soon as it is closed.

11. A safety device for centrifugal machines including in combination a basket and its shaft, a basket closure, a safety device comprising a locking member slidable along the shaft and means interengaging with the shaft for compelling rotation of the locking member relatively to the shaft as it slides therealong, and means on the closure engaging with said locking member.

12. A safety device for centrifugal machines including in combination a basket and its shaft, a basket closure, a locking sleeve slidable along the shaft, and having a helical groove therein and a pin fixed to the shaft and working in the groove.

13. A safety device for centrifugal machines including in combination a basket and its shaft, a basket closure, a locking sleeve slidable along the shaft, and having a helical groove therein and a pin fixed to the shaft and working in the groove and a spring latch on the closure engaging automatically with the sleeve.

14. A safety device for centrifugal machines including in combination a basket and its shaft, a basket closure, a locking sleeve slidable along the shaft, and having a helical groove therein and a pin fixed to the shaft and working in the groove and a yielding device on the closure engaging automatically with the sleeve.

15. A safety device for centrifugal machines including in combination a basket and its shaft, a basket closure, a locking sleeve slidable along the shaft, and having a helical groove therein and a pin fixed to the shaft and working in the groove, the groove being formed to cause the pin to lock the sleeve in locking position.

16. A safety device for centrifugal machines including in combination a basket and its shaft, a basket closure, a locking sleeve slidable along the shaft, and having a helical groove therein and a pin fixed to the shaft and working in the groove, the groove being formed at one end thereof to cause the pin to lock the sleeve in locking position.

17. A safety device for centrifugal machines including in combination a basket, a closure therefor, means operating automatically by closing the closure to lock it in closed position, means cooperating with the basket shaft for preventing the unlocking of the closure until the basket is at rest, and movable to unlock said closure only when the basket is at rest and returning immediately after such movement to closure-locking position, and means preventing the application of power to the basket until the closure is closed.

18. A safety device for centrifugal machines including in combination a basket, a closure therefor, means operating automatically by closing the closure to lock it in closed position, means carried partly by the closure and partly by the basket shaft for preventing the unlocking of the closure until the basket is at rest, and movable to unlock said closure only when the basket is at rest and returning immediately after such movement to closure-locking position and means preventing the application of power to the basket until the closure is closed, but not interfering with the rotation of the basket manually by an operative.

19. A centrifugal machine including in combination a basket and shaft, a basket closure, safety closure means comprising a device on the shaft normally in locking position and movable to unlocking position by rotation relatively to the shaft in the direction of rotation of the shaft.

20. A centrifugal machine including in combination a basket and shaft, a basket closure, a safety closure means comprising a device on the shaft, movable to unlocking position by rotation relatively to the shaft in the direction of rotation of the shaft.

21. A centrifugal machine including in combination a basket and shaft, a basket closure, safety closure means comprising a device on the shaft and movable to unlocking position by rotation relatively to the shaft in the direction of rotation of the shaft, and a device on the closure automatically interlocking with said device on the shaft.

22. A centrifugal machine including in combination a basket and shaft, a basket closure, safety closure means comprising a device on the shaft normally in locking position and movable to unlocking position by rotation relatively to the shaft in the direction of rotation of the shaft, a device on the closure automatically interlocking with said device on the shaft, and means operable to start the machine only after said devices are interlocked.

23. A centrifugal extractor including in combination a basket, a driving shaft, a basket cover, locking means for the cover including a member driven by the shaft and a member controlled by the cover, the cover being unlocked by rotating one of said members relatively to the shaft and in the same direction as the shaft drives, and means for preventing the basket starting until the cover is locked.

24. A centrifugal extractor including in combination a basket, a driving shaft, a basket cover, locking means for the cover including a member rotating with the shaft and a member controlled by the cover, the cover being unlocked by rotating said rotating member relatively to the shaft and in the same direction as the shaft drives, and means for preventing the basket starting until the cover is locked.

25. A centrifugal extractor including in combination a basket, a driving shaft, a basket cover, locking means for the cover including a member rotating with the shaft and movable longitudinally thereof and a member controlled by the cover, the cover being unlocked by rotating said rotating member relatively to the shaft and in the direction in which the shaft drives to move it longitudinally of the shaft, and means for preventing the basket starting until the cover is locked.

26. A centrifugal extractor including in combination a basket, a driving shaft, a safety cover, a safety lock including a member movable with the cover and a member concentric with and rotating with the shaft and being rotatable in the same direction relatively thereto and controlling said first mentioned movable member.

27. A centrifugal extractor including in combination a basket, a driving shaft, a safety cover, a safety lock including a member movable with the cover and a member mounted upon and longitudinally movable on and rotating with the shaft and being rotatable in the same direction relatively thereto and controlling said first mentioned movable member.

28. A centrifugal extractor including in combination a basket, a driving shaft, a safety cover, a safety lock including a member movable with the cover and a member rotating with the shaft and longitudinally movable thereon and being rotatable in the same direction relatively thereto for preventing the opening of the cover as long as the shaft continues to rotate.

29. A centrifugal extractor including in combination a basket, a driving shaft, a safety cover, a safety lock including a member movable with the cover and a member mounted upon concentric with and longitudinally movable on the shaft and rotating with it and being rotatable in the same direction relatively thereto and controlling said first mentioned movable member.

30. A centrifugal extractor including in combination a basket, a driving shaft, a safety cover, a safety lock including a member movable with the cover and a member rotating with the shaft and being rotatable in the same direction relatively thereto to pass out of the path of said first-mentioned member.

31. A centrifugal extractor including in combination a basket, a driving shaft, a safety cover, a safety lock including a member movable with the cover and a member mounted upon and rotating with the shaft and being rotatable in the same direction relatively thereto to pass out of the path of said first mentioned member.

32. A centrifugal extractor including in combination a basket, a driving shaft, a safety cover, a safety lock including a member movable with the cover and a member rotating with the cover and a member rotating with the shaft and being rotatable in the same direction relatively thereto and controlling said first-mentioned movable member, and means for preventing starting of the shaft while the cover is open.

33. A centrifugal extractor including in combination a basket, a driving shaft, a safety cover, a safety lock including a member movable with the cover and a member rotating with the shaft and being rotatable in the same direction relatively thereto and controlling said first-mentioned movable member, and means cooperating with one of said members for preventing starting of the shaft while the cover is open.

34. A centrifgual extractor including in combination a basket, a driving shaft, a safety cover, a safety lock including a member movable with the cover and a member mounted upon and rotating with the shaft and being rotatable in the same direction relatively thereto and controlling said first mentioned movable member, and means for preventing starting of the shaft while the cover is open.

35. A centrifugal extractor including in combination a basket, a driving shaft, a safety cover, a safety lock including a member movable with the cover and a member mounted upon and rotating with the shaft and being rotatable in the same direction relatively thereto and controlling said first-mentioned movable member and means cooperating with one of said members for preventing starting of the shaft while the cover is open.

36. In combination with a centrifugal machine, a driving shaft, a locking sleeve, means, including a key and a diagonal slot, for positioning the sleeve on the shaft, and a locking member movable with the cover of the centrifugal, the locking sleeve being engageable with the locking member for preventing the opening of the cover while the shaft and the basket of the centrifugal machine are rotating.

In testimony whereof, I have signed my name to this specification.

TANDY A. BRYSON.